United States Patent
Nakagawa

[11] 3,910,248
[45] Oct. 7, 1975

[54] TORCH IGNITED RECIPROCATORY ENGINE AND METHOD OF OPERATING THE SAME

[75] Inventor: Yasuhiko Nakagawa, Fujisawa, Japan

[73] Assignee: Nissan Motor Company Limited, Yokohama, Japan

[22] Filed: Feb. 25, 1974

[21] Appl. No.: 445,160

[30] Foreign Application Priority Data
Feb. 26, 1973 Japan.................................. 48-22972

[52] U.S. Cl........ 123/191 S; 123/75 B; 123/DIG. 4; 123/325 P
[51] Int. Cl.² ............................................ F02B 19/10
[58] Field of Search........... 123/32 C, 32 ST, 325 P, 123/325 PA, 75 B, 191 S, 191 SP, DIG. 4

[56] References Cited
UNITED STATES PATENTS

| | | | |
|---|---|---|---|
| 2,156,665 | 5/1939 | Mallory | 123/325 PA |
| 2,199,706 | 5/1940 | Mallory | 123/325 PA |
| 3,174,470 | 3/1965 | Von Seggern et al. | 123/325 PA X |
| 3,439,658 | 4/1969 | Simonet | 123/32 ST X |
| 3,830,206 | 8/1974 | Asaka et al. | 123/32 ST |

Primary Examiner—Charles J. Myhre
Assistant Examiner—William C. Anderson

[57] ABSTRACT

The ratio of the volume of air-fuel mixture fed into on antechamber opening into the main combustion to the volume fed directly into the main combustion is not more than $$\frac{\kappa \cdot \theta}{\epsilon - \theta}$$

in order to prevent premature flow of air-fuel mixture from the antechamber into the main combustion chamber, where $\phi$ is the ratio of the antechamber volume to the clearance volume at TDC, $\epsilon$ is the compression ratio, and $\kappa$ is an empirical correction coefficient.

4 Claims, 1 Drawing Figure

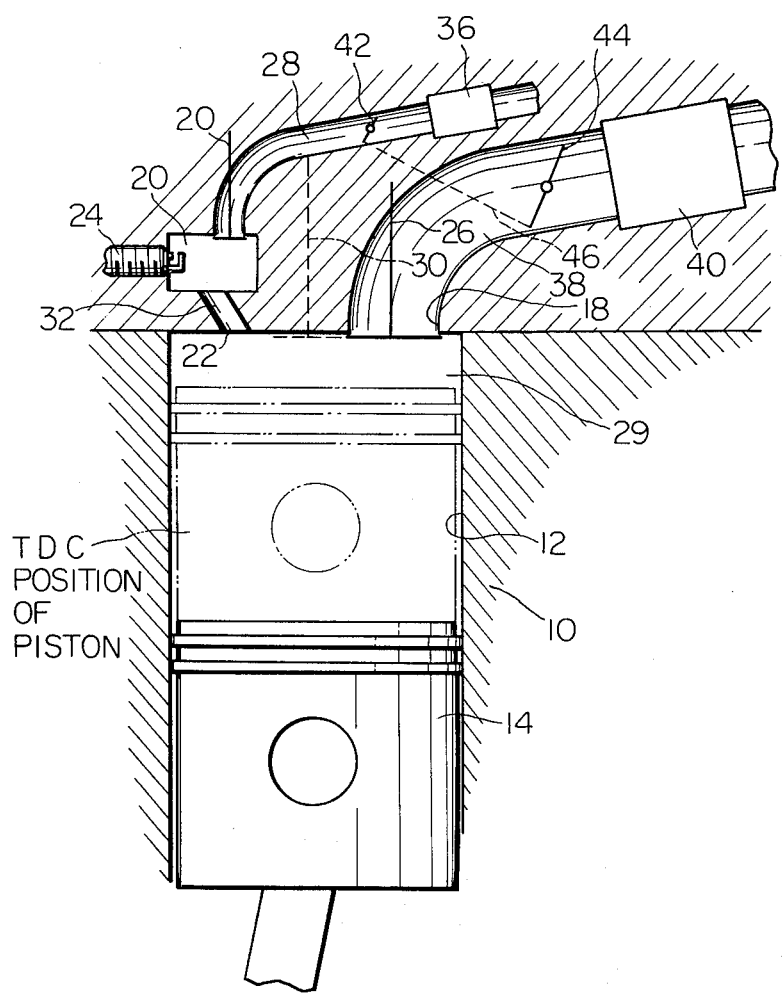

TORCH IGNITED RECIPROCATORY ENGINE AND METHOD OF OPERATING THE SAME

The present invention relates to a torch ignited reciprocatory engine and to a method of operating such an engine.

In a conventional torch ignited reciprocatory engine, during the intake stroke, a relatively rich air-fuel mixture is drawn into an antechamber via an auxiliary inlet valve, and at the same time, a relatively lean air-fuel mixture is drown into a main combustion chamber via a main inlet valve. Ignition is performed within the antechamber by suitable ignition means, such as a spark plug, to provide a torch flame for ignition of the relatively lean mixture within the main combustion chamber. During the intake stroke, air-fuel mixture from the antechamber is liable to prematurely enter the cylinder due to the suction produced by the piston, and as a result, the combustible mixture in the antechamber becomes lean prior to ignition, failing to ignite safely.

Because of the leakage of combustible mixture during the intake stroke, a conventional torch ignited reciprocatory engine, to assure safe ignition, will necessarily require an overabundance of fuel in the antechamber. Accordingly, the present invention aims at eliminating the above mentioned shortcoming of conventional torch ignited reciprocatory engines.

It is an object of the present invention to provide a method of operating a torch ignited reciprocatory engine to prevent leakage of combustible mixture from an antechamber into a main combustion chamber during the intake stroke of the engine.

It is another object of the present invention to provide a combustible mixture induction system for a torch ignited reciprocatory engine which performs the method of the present invention.

The present invention is hereinafter described with reference to the accompanying drawing, in which:-

A single FIGURE is a fragmentary sectional view of a torch ignited reciprocatory engine illustrating a combustible mixture induction system emobdying the present invention.

The engine illustrated in the sole FIGURE comprises a cylinder block 10 having a cylinder bore 12 within which a piston 14 is reciprocally slidable. The end of the cylinder bore 12 is closed by a cylinder head 16.

The cylinder head 16 has a main inlet port 18 and an exhaust port (not shown), and is formed with an antechamber 20 and a torch spout port 22. A spark plug 24, a main inlet valve 26, an axuiliary inlet valve 28 and an exhaust valve 30 are operatively arranged in the cylinder head 16.

The antechamber 20 leads into a main combustion chamber 29 through a passageway 32 and the port 22. The spark plug 24 extends into the antechamber 20. Installed in an auxiliary intake passageway 34 is a suitable fuel supply means, such as a rich set carburettor 36 or a fuel injector arranged to inject a relatively large volume of fuel per each intake stroke of the engine. Installed in a main intake passageway 38 is another suitable fuel supply means, such as a lean set carburettor 40 or a fuel injector arranged to inject a relatively small volume of fuel per each intake stroke.

Installed downstream of the fuel supply means 36 are second valve means such as a butterfly valve 42 to vary the cross-sectional area of the passageway 34 and therefore the flow rate therethrough. Installed downstream of the fuel supply means 40 is first valve means such as a butterfly valve 44 to similarly vary the flow rate through the passageway 38. Preferably these valves 42 and 44 are operatively linked together by a mechanical linkage 46 so that the flow rates through the intake passageways 34 and 38 into the antechamber 20 and the main combustion chamber 29 are of a certain ratio which will be described hereafter.

It has been found that in order to prevent combustible mixture from being drawn from the antechamber 20 into the main combustion chamber 29 during the intake stroke, the ratio of the volume of combustible mixture fed into the antechamber 20 to that fed directly into the main combustion chamber 29 should be $$\frac{V_2}{V_1} \leq \frac{V_c \cdot \phi}{V_c(1-\phi)+V_s} = \frac{\phi}{1-\phi+\frac{V_s}{V_c}} \quad (1)$$

where:

$V_1$ : the volume of combustible mixture fed into the main combustion chamber 29 or the flow rate through the valve 44

$V_2$ : the volume of combustible mixture fed into the antechamber 20 or the flow rate through the valve 42

$V_c$ : the clearance volume at TDC (including the volume of the antechamber 20)

$V_s$ : the stroke of the piston 14

$\phi$ : the ratio of the volume of the antechamber 20 to the clearance volume $V_c$.

$$1 + \frac{V_s}{V_c} = \epsilon$$

Since,
Thus, $$\frac{V_2}{V_1} \leq \frac{\phi}{\epsilon - \phi} \quad (2)$$

where: $\epsilon$ : the compression ratio.

In practical operation of the engine residual burned gas in the combustion chamber 29 has to be taken into consideration. Hence; the equation (2) becomes $$\frac{V_2}{V_1} \leq \frac{\kappa \cdot \phi}{\epsilon - \phi} \quad (3)$$

where:

$\kappa$: an empirical correction coefficient ($0.8 < \kappa < 2.0$)

Preferably, in torch ignited reciprocatory engines, the air-fuel ratio of the combustible mixture drawn into the antechamber 20 should be between 1 and 8, the air-fuel ratio of the mixture drawn into the main combustion chamber 29 between 16 and 40, $\phi$ between 0.05 and 0.3, $\epsilon$ between 7 and 10 and the ratio of the cross-sectional area of the inlet port 22 to the cross sectional-area of the piston 14 between 0.001 and 0.03. It is of course also necessary to take into account the flow resistance in the passageway 32 to satisfy the above equation (3).

Although in the preferred embodiment described above, the butterfly valves 42 and 44 are employed to control the flow through the passageways 34 and 38 respectively, the same results may be obtained by controlling the opening periods of the main inlet valve 26 and the auxiliary inlet valve 28 by suitably modifying the cam mechanism for the valves.

It has been found that leakage of combustible mixture from the antechamber 20 into the main combustion chamber 29 during the intake stroke of the engine is substantially prevented by charging the main combustion chamber 29 and the antechamber 20 with combustible mixture according to equation (3).

It will therefore be appreciated that safe ignition of the combustible mixture and operation of the engine on a lean air-fuel mixture are accomplished by the invention.

What is claimed is:

1. A method of operating a torch ignited reciprocatory engine which has a main combustion chamber and an antechamber communicating with the main combustion chamber, comprising, during the intake stroke of the engine, feeding lean and rich combustible mixtures into the main combustion chamber and the antechamber, respectively so that the ratio of the volume $V_2$ of rich combustible mixture fed into the antechamber to the volume $V_1$ of lean combustible mixture fed into the main combustion chamber satisfies the relation $$\frac{V_2}{V_1} \leqq \frac{\kappa \cdot \phi}{\epsilon - \phi}$$

where
$\phi$ is the ratio of the volume of the antechamber to the clearance volume at TDC, $\epsilon$ the compression ratio, and $\kappa$ a correction coefficient.

2. A method as claimed in claim 1, wherein $\phi$ is between 0.05 and 0.3, $\epsilon$ between 7 and 10, and $\kappa$ between 0.8 and 2.0.

3. In a torch ignited reciprocatory engine having an air intake system including a main intake passageway leading into a main combustion chamber, an auxiliary intake passageway leading into the main combustion chamber through an antechamber, first valve means disposed within the main intake passageway and second valve means disposed within the auxiliary intake passageway, the improvement being in that said first and second valve means are operatively linked together so that the ratio of the flow rate $V_2$ of a combustible mixture through said second valve means to the flow rate $V_1$ through said first valve means satisfies the relation $$\frac{V_2}{V_1} \leqq \frac{\kappa \cdot \phi}{\epsilon - \phi}$$

where:
$\phi$ is the ratio of the volume of the antechamber to the clearance volume at TDC, $\epsilon$ the compression ratio, and $\kappa$ a correction coefficient.

4. An engine as claimed in claim 3, wherein $\phi$ is between 0.05 and 0.3, $\epsilon$ between 7 and 10, and $\kappa$ between 0.8 and 2.0.

* * * * *